(12) United States Patent
Cavallaro

(10) Patent No.: US 9,517,614 B1
(45) Date of Patent: Dec. 13, 2016

(54) DELAMINATION AND CRACK PREVENTION LAYER FOR STRUCTURAL SANDWICH PANELS

(71) Applicant: Paul V Cavallaro, Raynham, MA (US)

(72) Inventor: Paul V Cavallaro, Raynham, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 278 days.

(21) Appl. No.: 14/549,586

(22) Filed: Nov. 21, 2014

(51) Int. Cl.
| | |
|---|---|
| *B32B 38/04* | (2006.01) |
| *E04C 2/292* | (2006.01) |
| *B32B 38/00* | (2006.01) |
| *B32B 15/04* | (2006.01) |
| *B32B 5/20* | (2006.01) |
| *B32B 5/18* | (2006.01) |

(52) U.S. Cl.
CPC .............. *B32B 38/0004* (2013.01); *B32B 5/18* (2013.01); *B32B 5/20* (2013.01); *B32B 15/046* (2013.01); *B32B 2305/00* (2013.01); *B32B 2305/022* (2013.01); *E04C 2/292* (2013.01); *Y10T 156/1052* (2015.01)

(58) Field of Classification Search
CPC .. B32B 15/046; B32B 38/0004; B32B 38/042; B32B 2305/022; B32B 5/18; B32B 5/20; B32B 9/046; B32B 2038/0084; Y10T 156/1002; Y10T 156/1007; Y10T 156/1015; Y10T 156/1052; Y10T 156/1074; E04C 2/292
See application file for complete search history.

(56) References Cited

U.S. PATENT DOCUMENTS

| | | | |
|---|---|---|---|
| 6,291,049 B1* | 9/2001 | Kunkel | ..................... B32B 3/06 428/119 |
| 2007/0141344 A1* | 6/2007 | Miller | ...................... B32B 5/18 428/408 |
| 2015/0099093 A1* | 4/2015 | Arbesman | ................. B32B 3/30 428/139 |

FOREIGN PATENT DOCUMENTS

| | | | | |
|---|---|---|---|---|
| CA | 2127339 A1 * | 1/1996 | ............. | B24B 19/00 |

* cited by examiner

*Primary Examiner* — Carson Gross
(74) *Attorney, Agent, or Firm* — James M. Kasischke; Michael P. Stanley

(57) ABSTRACT

A method of manufacturing a delamination and crack prevention layer (DCPL) is provided for use in laminated sandwich panels. The DCPL is formed by using a continuous rolling process and by cutting finger profiles. Each finger forms a beam extending outward at a desired angle from a DCPL plane. The upper and lower DCPL planes are aligned to provide a uniform distribution of fingers along a length of the DCPL. Face sheets are bonded to the outer DCPL planes. Foam infusers add foam between the DCPL planes and among the fingers. The foam is rigidified (cured) during a continuous roll-form process. The DCPL prevents propagation of delamination between adjacent face sheets and core layers as well as arresting cracks in the core layers.

19 Claims, 22 Drawing Sheets

DELAMINATION AND CRACK PREVENTION LAYER FOR STRUCTURAL SANDWICH PANELS

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER APPLICATIONS

None.

BACKGROUND OF THE INVENTION

Field of the Invention

The present invention is a method for producing a delamination and crack prevention layer that can be used to enhance damage tolerance levels in laminated sandwich panels.

Description of the Prior Art

Laminated sandwich panels are characterized by a comparatively low weight, exceptional planar and bending strength and stiffness properties. However, the laminated sandwich panels often lack a through thickness tension, compression strengths and stiffness levels that are found in plates formed from conventional homogenous materials. The through-thickness stresses, often referred to as "weak direction stresses" are the transverse normal stress $\sigma_{zz}$ and the transverse shear stresses $\sigma_{xz}$, $\sigma_{yz}$. These stresses are identified in the boxes displayed in FIG. 1.

Structural sandwich panels subject to mechanical or thermal loads will develop stresses in the face sheets, face sheet-to-core bond layers and in the core layer(s). These stresses can lead to failure initiation. If stress levels become sufficiently high, cracks can propagate along planes that are parallel, normal and oblique to a neutral surface of the panel. When high strength thermoset polymers (i.e. epoxies) are used as face sheet-to-core bonding material; the available fracture toughness (i.e., the ability to resist plastic deformation and crack growth) is generally insufficient at high stress levels.

This insufficiency allows cracks to propagate with repeated load cycles at a stable or possibly unstable rate. Once sufficient crack propagation has occurred, a face sheet can delaminate from the core; thereby, causing strain energy to be released; stiffness to be reduced; and the load carrying capacity to diminish.

FIG. 2 depicts an example of delamination of a carbon fiber/foam core sandwich panel 1 with a face sheet 2 separating from a foam core 3. For the same sandwich panel 1, FIG. 3 depicts a core shear failure in which the foam core 3 is fractured.

No crack arresting boundaries are present in FIG. 3. The placement of delamination and crack arresting boundaries is analogous to the operation of rip-stop fabrics; whereby tears are prevented from propagating across cells formed by the grid-like placement of rip-stop (higher strength) yarns.

In the prior art; Miller (U.S. Pat. No. 7,972,698) describes a series of continuous reinforcing fibers (fiberglass, carbon, etc.) disposed at different angles to strengthen foam cores of a sandwich panel and intended for use with vacuum bagging, resin transfer molding (RTM), vacuum assisted resin transfer molding (VARTM) and other resin infusion methods.

The Miller reference requires structural continuity of the reinforcing fibers between the faces of the core (and optionally through the skins) which can produce electrical conductivity between skins. This electrical conductivity can be an undesirable characteristic for structures, especially those structures requiring EMI hardening. Also, the reinforcing fibers of the cited reference provide increased panel strength and stiffness at the expense of increased weight.

The Miller reference further requires continuity of the reinforcing fibers between skins such that during resin infusion; the reinforcements become tensioned and are then capable of resisting motions and maintaining positional alignment and uniformity within the foam core. If the core reinforcing fibers were made to be discontinuous, the fibers would become segmented and cantilevered.

Prior to the resin infusion process, the core reinforcing fibers are not rigidified and therefore would (1) lack bending stiffness to resist movement resulting from lateral pressure applied during the resin infusion process and (2) would be unable to maintain an intended alignment, positional uniformity and directional stiffness enhancements for the overall panel. Use of the cited reference results in a sandwich panel having a comparatively greater areal weight density. As such, the reference does not provide an optimal solution for sandwich panels requiring less weight.

The Miller reference further requires that multiple foam core strips, attached webs, inner skins and fiber reinforcements be positioned together and then infused with a flowable adhesive resin to rigidify the assembly during the molding process. The process requires several labor-intensive pre-assembly, non-continuous steps (cutting foam strips and webs to pre-determined lengths, wrapping the foam strips with fibrous outer layers, stitching fiber reinforcements through the rigid foam strips) and continuous assembly steps (adding inner and outer skin layers followed by an adhesive resin infusion step and a pressurization step).

Sandwich panels are highly engineered structural systems. To achieve their peak load carrying capacities and damage tolerance levels; all components of these layered systems must remain functional throughout the loading event. Otherwise, damage will develop and structural integrity will be compromised. As such, there is a need to minimize the effects of through-thickness normal stresses and both transverse and in-plane stresses. There is also a need to prevent face sheet and face sheet-to-core delamination and to provide crack arresting boundaries.

SUMMARY OF THE INVENTION

The method of the present invention provides a delamination and crack prevention layer (DCPL) that can be used to improve toughness and damage tolerance levels in laminated sandwich panels. The DCPL is formed by using a continuous rolling process on a thin layer of metal or other formable material. The process forms fingers by cutting profiles that define each finger. Each finger forms a cantilever beam with a free end extending outward from a DCPL plane to right angles. Once bent, the fingers remain connected to the DCPL plane.

The continuous manufacturing process aligns upper and lower DCPL planes in a vertical placement to provide a uniform distribution of fingers along a length of the DCPL. Face sheets are then bonded to the outer DCPL planes. Foam infusers add foam between the DCPL planes and among the fingers. The foam expands to fill an inner panel volume as well as an open void region of the DCPL. This expansion maximizes the structural reinforcement provided by the DCPL. The foam is rigidified (cured) during a continuous roll-form process. Compression rollers maintain a required panel thickness during the curing. For thermal efficiency and electrical isolation, fingers of the upper DCPL do not contact the lower DCPL.

The present invention describes a fully-continuous, roll-form, manufacturing process using rolls of skin materials, rolls of damage tolerant formable element layers and liquid foam injection methods to produce lightweight sandwich panels having enhanced overall damage tolerance.

An advantage of the present invention is that the load carrying capacity and fatigue life of a lightweight sandwich structure can be enhanced while decreasing sensitivity to material and manufacturing defects. The DCPL prevents propagation of delaminations between adjacent face sheets and core layers as well as arresting cracks in the core layers. Core materials include metal, plastic, composites, wood, etc. The face sheets or skin layers can be metal (for example: aluminum, titanium, steel), ceramic, textile, matrix-reinforced composite (fiberglass, carbon, Kevlar), plastic (thermoset, thermoplastic), wood or any generally considered structural material. Another purpose of the present invention is to develop a continuous manufacturing method for producing laminated sandwich panels that incorporate one or more DCPLs.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

Figure 4:
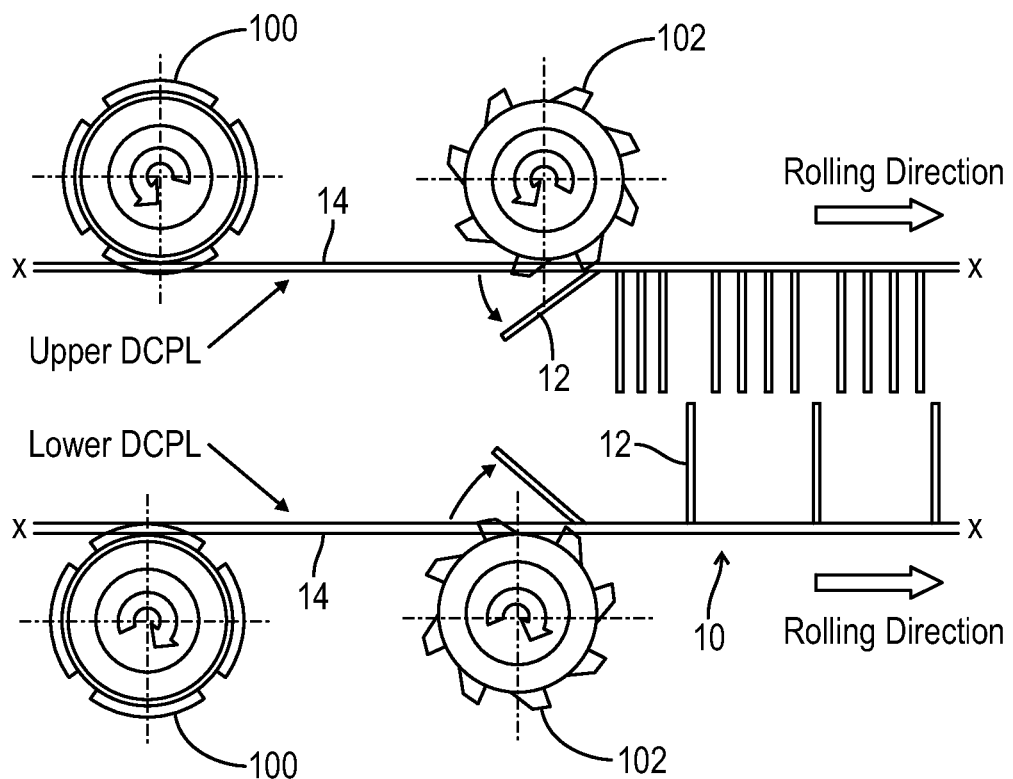
FIG. 4 depicts a finger profile cutting and forming roller assembly for manufacturing a delamination and crack prevention layer.
Figure 5:
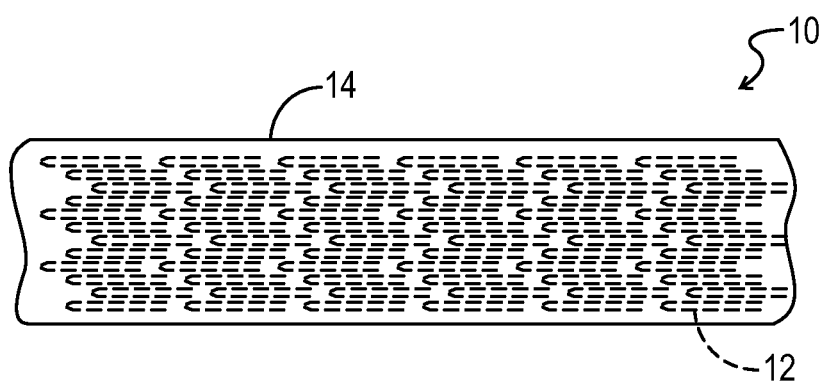
FIG. 5 depicts a plan view of an embodiment of a delamination and crack prevention layer of the present invention with the finger outlines cut by the cutting rollers prior to bending.

Referring again to the figures, a process of manufacturing a representative delamination and crack prevention layer (DCPL) 10 is shown in FIG. 4. The DCPL 10, as shown in FIG. 5, is formed by using a continuous rolling process on a thin layer of metal or other formable material. The rolling (or stamping) process by finger profile cutting rollers 100 and finger forming rollers 102 forms fingers 12 of controllable geometry and placement by cutting profiles defining each finger.

The cutting rollers 100 simply cut outlines of the fingers 12 (as indicated by the dashed lines of FIG. 5) within the plane of the DCPL 10. The outline cuts are made on the edges of the fingers 12 except for a neck region of the fingers. The neck regions are the remaining ligaments connecting the fingers 12 to the DCPL (as shown in the right-most region of each finger illustrated in FIG. 5).

The neck regions are then deformed by the finger forming rollers 102. The forming rollers 102 bend the fingers 12 away from a DCPL plane 14 to an out-of-normal (or other specified angle) position. The finger cutting rollers 100 and the finger forming rollers 102 are preferably manufactured from hardened steel or other suitable materials having high wear resistance and registered for tracking purposes to maintain relative alignment during a complete finger cutting and forming process. An alternative to the finger cutting rollers is the use of lasers to cut the finger outlines.

Figure 1:
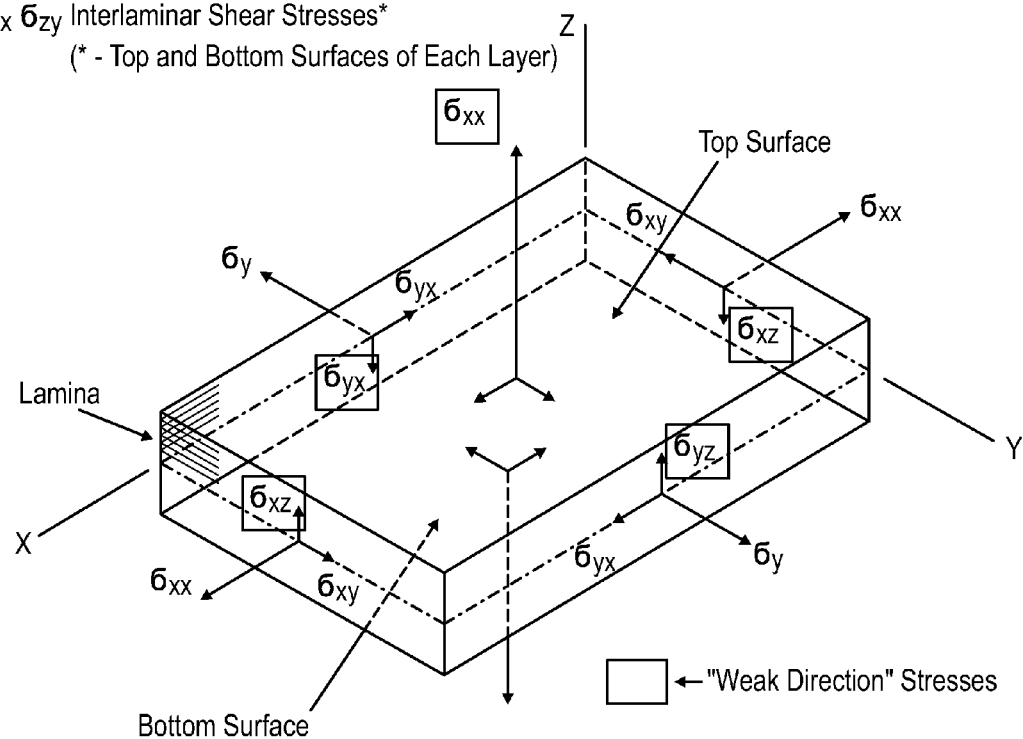
FIG. 1 is a prior art depiction of a laminated sandwich panel in which through-thickness stresses, transverse normal stress and transverse shear stresses are identified.
Figure 2:
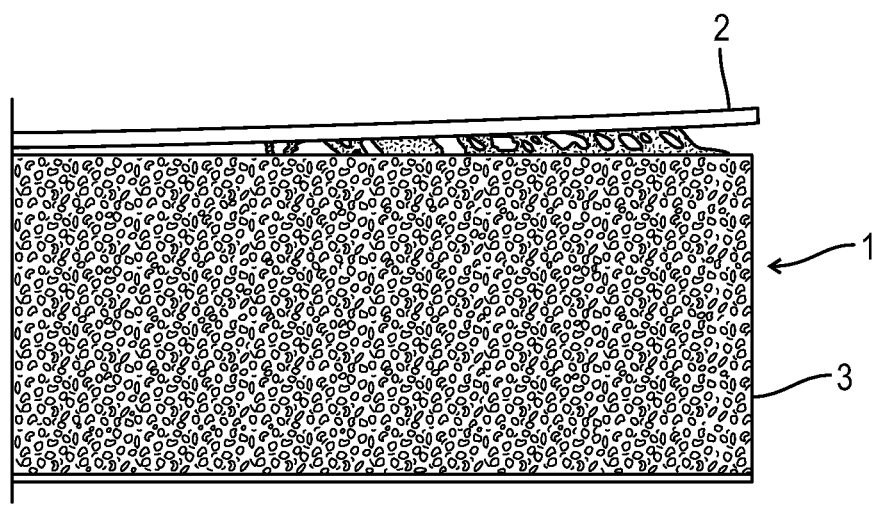
FIG. 2 depicts a prior art example of a face sheet-to-core delamination for a carbon fiber/foam core sandwich panel.
Figure 3:
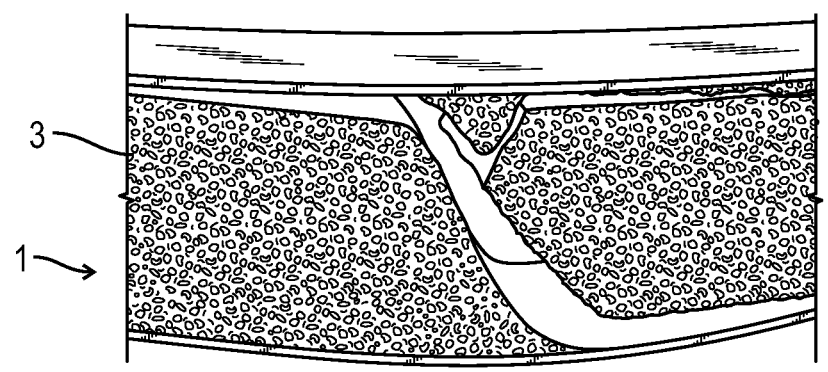
FIG. 3 depicts a prior art example of a core shear failure of a sandwich panel in which a foam core is fractured.
Figure 6:
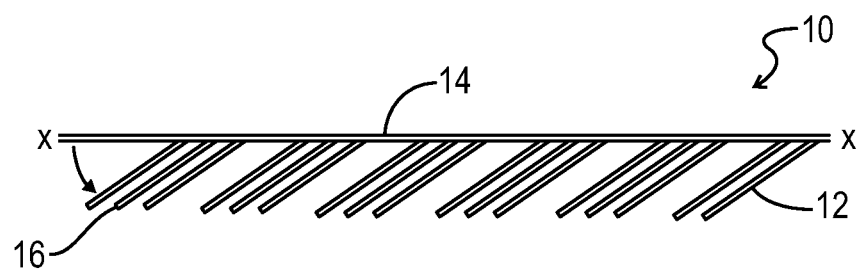
FIG. 6 depicts a side view of the delamination and crack prevention layer of the present invention with the fingers of the layer partially extended by the forming rollers.
Figure 7:
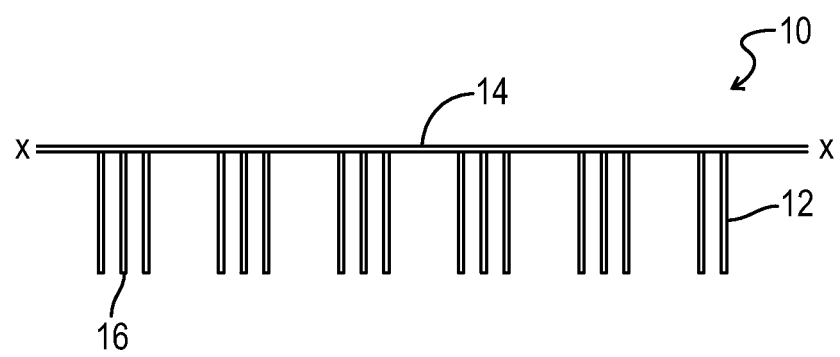
FIG. 7 depicts a side view of the delamination and crack prevention layer of the present invention with the fingers fully extended at a right angle from the layer.
Figure 8:
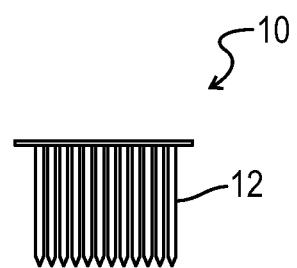
FIG. 8 depicts an end view of the delamination and crack prevention layer of the present invention.

As shown in FIGS. 6-8, each finger 12 forms a cantilever beam with a free end 16 extending outward from a DCPL plane (X-X plane) 14 to right angles (or other desired angles). The thickness of the fingers 12 is directly related to the thickness of the DCPL 10. Proper selection of a thickness of the DCPL 10 is dependent on the magnitude of stress components shown in FIG. 1 and the fracture behavior of the core (i.e. the critical strain energy release rate, etc.).

Figure 9:
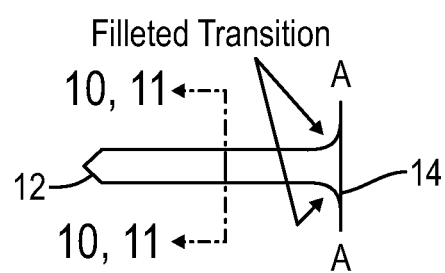
FIG. 9 depicts a straight finger configuration used with the delamination and crack prevention layer of the present invention.
Figure 10:
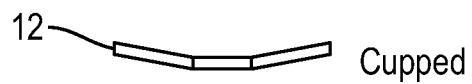
FIG. 10 depicts a cross-section view of a cupped finger configuration with the view taken from reference lines 10-10 of FIG. 9.
Figure 11:
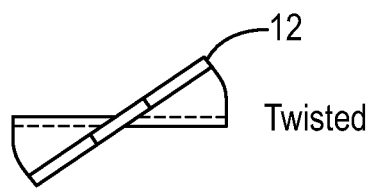
FIG. 11 depicts a cross-section view of a twisted finger configuration with the view taken from reference lines 11-11 of FIG. 9.
Figure 12:
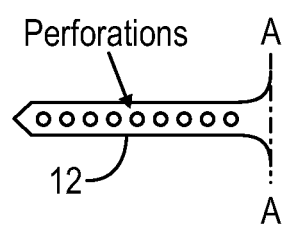
FIG. 12 depicts a perforated straight finger configuration.
Figure 19:
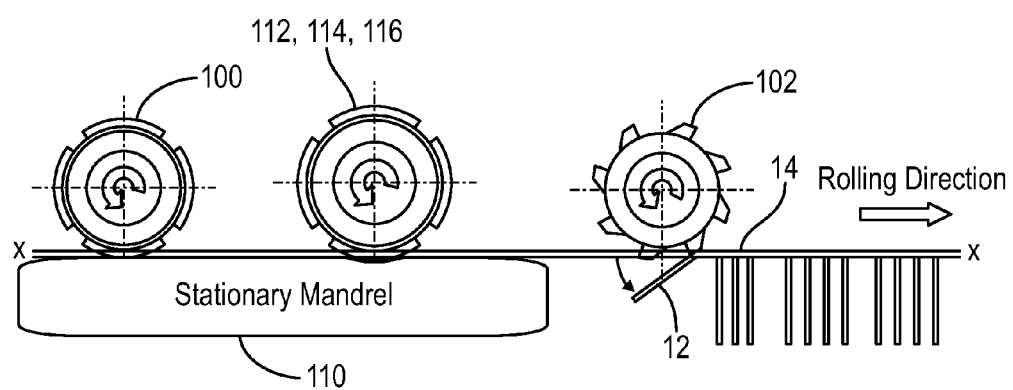
FIG. 19 depicts a finger profile cutting and forming roller assembly with stationary mandrel for manufacturing a delamination and crack prevention layer with specialized shaped fingers.
Figure 20:
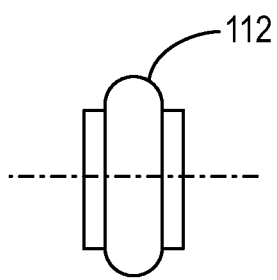
FIG. 20 depicts a finger cutting roller for forming cupped fingers.
Figure 21:
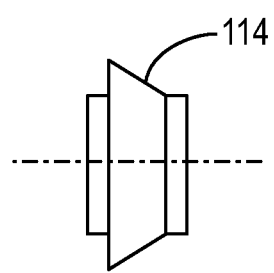
FIG. 21 depicts a finger cutting roller for forming twisted fingers.
Figure 22:
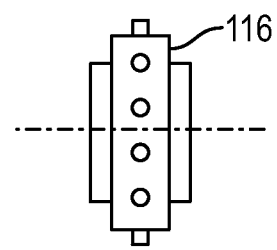
FIG. 22 depicts a finger cutting roller for forming perforated fingers.

As shown in FIG. 9, it is notable that once bent, the fingers 12 remain connected to the DCPL plane 14 along a single ligament or neck defined by line A-A. The connection is simply the only uncut portion of the outline of the finger 12 formed by the finger cutting rollers 100 but now in a bent position. The fingers 12 can be optimized for a variety of densities (number of fingers attached per DCPL plane 14), shapes and lengths (including variations of shapes and lengths within a single DCPL 10). The cross sections of a finger 12 may be formed in almost any cross section. As shown in FIG. 10, a finger 12 can be a cupped configuration (See FIGS. 19 and 20 for equipment that could cup a finger) or in FIG. 11, a twisted configuration for increased pull-out and shear strength (See FIGS. 19 and 21 for equipment that could twist a finger). A perforated configuration is shown in FIG. 12 (See FIGS. 19 and 22 for equipment that could perforate a finger).

Figure 13:
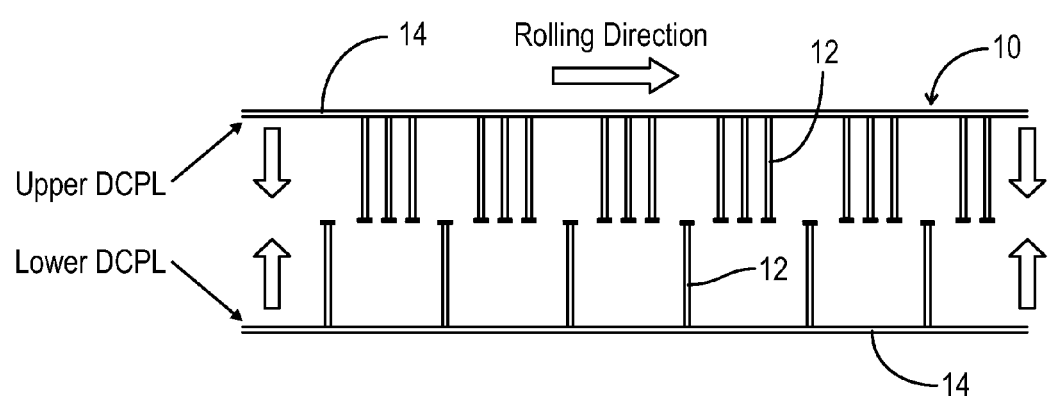
FIG. 13 depicts an alignment of upper and lower delamination and crack prevention planes.

As shown in FIG. 13, the continuous manufacturing process next aligns the separately formed upper and lower DCPL planes 14 in a proper vertical placement. The deposed angle of the fingers 12 with respect to the DCPL plane 14 is controlled by the finger forming rollers 102. The shaping of cam portions of the finger forming rollers 102 is designed to bend the fingers 12 to the required angles.

Figure 14:
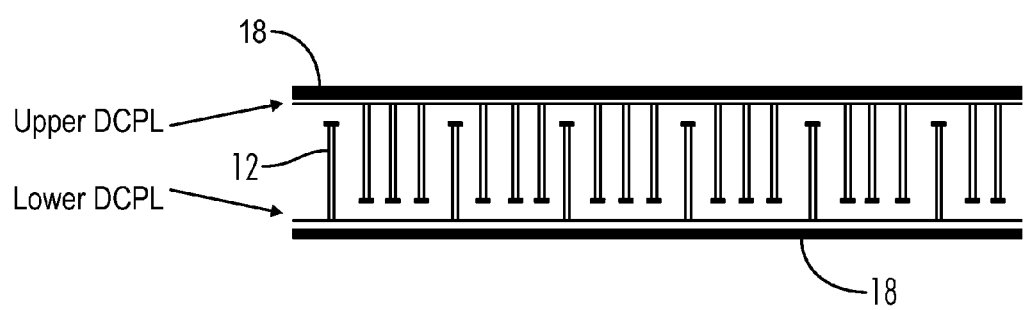
FIG. 14 depicts a formed lower delamination and crack prevention plane with face sheets added.

In FIG. 14, both DCPL planes 14 combine to provide a uniform distribution of fingers 12 along the length of the DCPL 10. Face sheets 18 are then bonded to the outer DCPL plane 14 with types of bonding methods known to those ordinarily skilled in the art.

Figure 15:
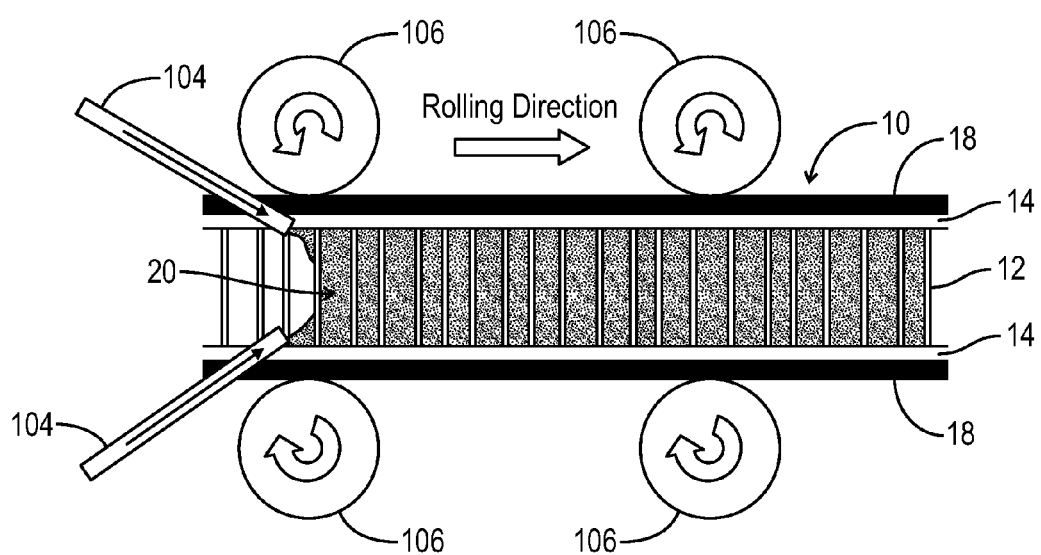
FIG. 15 depicts the addition of a foam infused core between the delamination and crack prevention planes.

In FIG. 15, the manufacturing process employs foam infusers 104 to add foam 20 between the DCPL planes 14 and among the fingers 12. The foam 20 is supplied in liquid form; between the DCPL planes 14; and rigidified (cured) during the continuous roll-form process. Compression rollers 106 maintain a required panel thickness during the curing of the foam 20.

Figure 16:
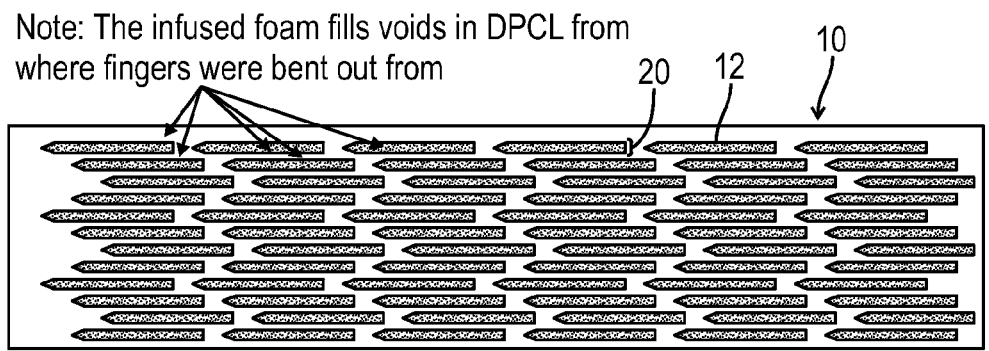
FIG. 16 depicts a finished delamination and crack prevention layer having a foam infused core and fingers extending from a plane of the layer with a covering face sheet removed for clarity.

As shown in FIG. 16, for a DCPL 10 with an infused foam cores and honeycomb/infused foam cores; the foam 20 expands to completely fill an inner panel volume as well as an open void region of the DCPL 10 from which the fingers 12 are bent away (i.e., plane X-X). This expansion of the foam 20 eliminates voids and maximizes the structural reinforcements provided by the DCPL 10.

The absence of an infused foam core, a solid or honeycomb core can be bonded to the face sheets 18 using liquid or film adhesives which will fill the void regions in the DCPL 10. Optionally, the invention can be used for a single DCPL plane 14. For thermal efficiency and electrical isolation, the fingers 12 of the upper DCPL do not contact the lower DCPL. Similarly, the fingers 12 of the lower DCPL should not contact the upper DCPL for a situation in which the fingers and DCPLs are constructed of conductive material.

Figure 17:
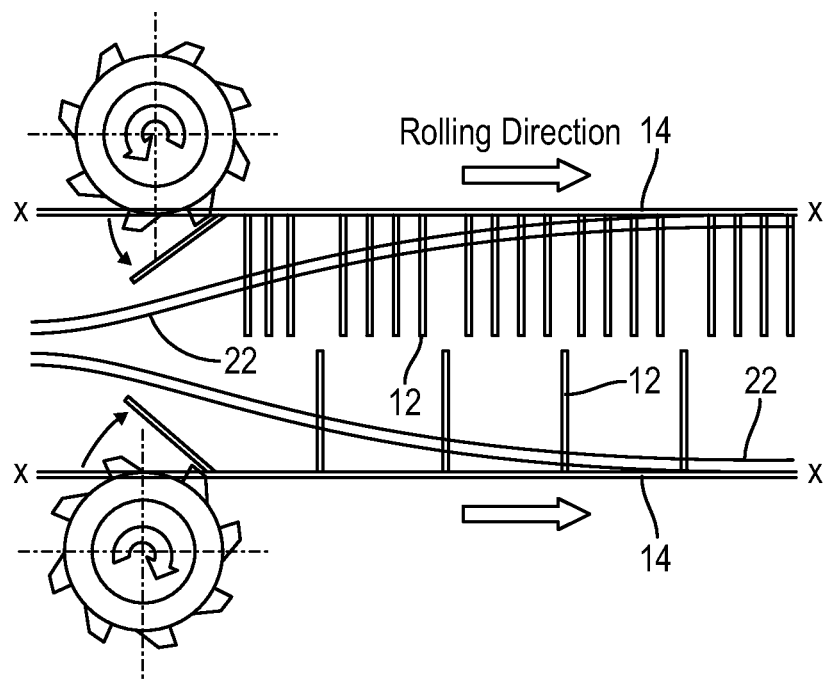
FIG. 17 depicts a delamination and crack prevention layer having penetrable face sheets.

As shown in FIG. 17, the present invention does not restrict the DCPL 10 to be the closest neighboring layer to the core. The invention allows the DCPL 10 to penetrate through penetrable face sheets 22 (i.e. woven composite fabrics, etc) and into the DCPL planes 14. For face sheets 22 constructed from fabrics, composite, wood and other thin materials; the fingers can be designed to perforate the face sheets. This capability allows the DCPL planes 14 to be outwardly positioned from and to capture such face sheets 22 so as to provide interlaminar and transverse normal delamination protections between the face sheets.

Figure 18:
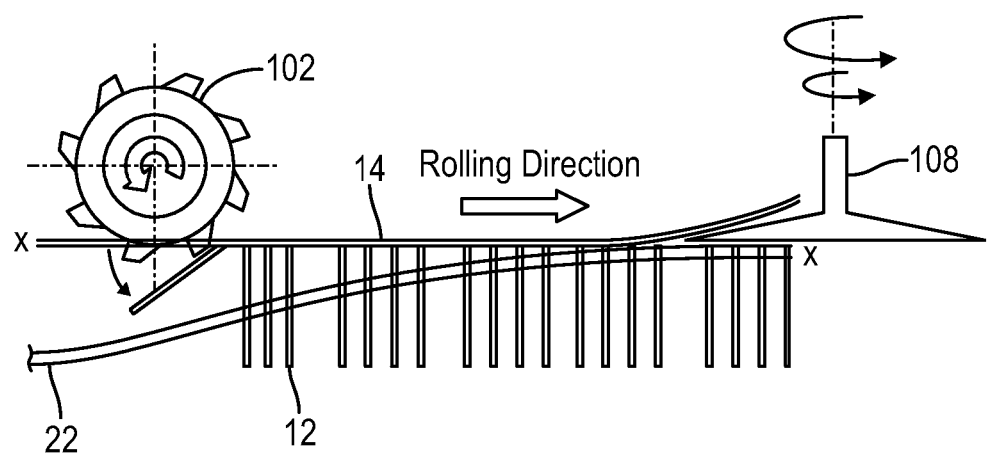
FIG. 18 depicts a delamination and crack prevention plane being removed by a rotary cutter.

The DCPL plane 14 can optionally be removed as demonstrated in FIG. 18. If the DCPL plane 14 is a metal material, a rotary cutting tool 108 or translating saw blade can be used. If the DCPL plane 14 is a plastic material, a hot knife or wire can be used.

As noted for FIGS. 10-12, FIG. 19 provides a manufacturing process for developing specialized fingers. In the figure, a stationary mandrel 110 is added beneath the DCPL plane 14 and the forming rollers 100. Specialized finger cutting rollers are used to form a cupped finger 12 (See cutting roller 112 of FIG. 20), a twisted finger 12 (See cutting roller 114 of FIG. 21) and a perforated finger 12 (See cutting roller 116 of FIG. 22).

The present invention intentionally does not provide continuity of the reinforcing fingers across the faces of the core or across the face sheets. The fingers are discontinuous, cantilevered and have sufficient bending stiffness to resist pressure during infusion of the foam. While the infusion process induces pressure within a core region; the pressure is distributed on all faces of the fingers 12 such that a net bending force is zero.

An advantage of the present invention is the capability to increase damage tolerance by (1) arresting core cracks, (2) arresting skin-to-core bond layer delaminations and, in the case of laminated skins (3) arresting interlaminar delaminations between plies with other skins. As cracks initiate and begin to propagate within the core; a crack front advances until the crack reaches a finger 12. Because there is a material mismatch at the finger-to-core interface; crack propagation is arrested. The fingers 12 act as substantive barriers thus preventing further growth of cracks. The spatial density of the fingers 12 dictate the largest crack that can be developed with a core.

The present invention does not increase the panel bending stiffness while the prior art does increase the panel bending stiffness with the result of increased areal weight densities. Also, the present invention does not require an adhesive resin; rather the invention employs a liquid foam. The liquid foam provides a bonding agent between the skin-core interface and the reinforcing fingers/core interface.

The present invention describes a fully-continuous, roll-form, manufacturing process using rolls of skin materials, rolls of damage tolerant formable element layers and liquid foam injection methods to produce ultra-lightweight sandwich panels having enhanced overall damage tolerance. In contrast, the prior art Miller reference provides for an optionally stronger and stiffer core than that of the present invention for sandwich panels having identical skins and foam core materials; however, the reference does so at the expense of increased weight, material and manufacturing costs.

Strength and damage tolerance mean two different things. Strength is the ability to support loads. Damage tolerance is the ability to function structurally in the presence of existing defects arising from manufacturing or damage from in-service use. A comparison of the invention and the Miller reference should consider the pure bending strength-to-weight ratios, bending stiffness-to-weight ratios, material and manufacturing costs.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:
1. A method of manufacturing a delamination and crack prevention layer, said method comprising the steps of:
    rolling two sheets of formable material wherein the two sheets are planes spaced apart and parallel to each other;
    providing at least one finger forming roller for each of the planes;

forming a plurality of fingers with the forming roller during said rolling step with the fingers being of controllable geometry and placement on each of the planes;

providing at least one profile cutting roller for each of the planes; and cutting profiles during said rolling step in each of the planes with the cutting roller, with the profiles defining each finger from the plurality of fingers such that each finger forms a cantilever beam with a free end extending outward from the plane at an angle.

2. The method of claim 1 wherein each finger of the plurality of fingers extends outward at a right angle to the plane.

3. The method of claim 2 said method further including the step of infusing foam between the spaced apart planes and among the plurality of extended fingers.

4. The method of claim 3 said method further comprising the steps of curing the foam and compressing the planes toward each other during said rolling step.

5. The method of claim 4 said method further comprising the step of bonding a face sheet to each of the planes on a side of the plane opposite that from which the plurality of fingers extend.

6. The method of claim 2 said method further including the step of cupping each finger wherein each finger is cupped when extending away from the plane such that a mid-section of each finger is bent away from a first and second end of the finger.

7. The method of claim 6 said method further including the step of infusing foam between the spaced apart planes and among the plurality of extended fingers.

8. The method of claim 7 said method further comprising the step of curing the foam and compressing the planes toward each other during said rolling step.

9. The method of claim 8 said method further comprising the step of bonding a face sheet to each of the planes on a side of the plane opposite that from which the plurality of fingers extend.

10. The method of claim 2 said method further including the step of twisting each finger wherein each finger is twisted around a central axis of the finger such that the finger is capable of increased pull-out and shear strength of a finger-to-core bond.

11. The method of claim 10 said method further including the step of infusing foam between the spaced apart planes and among the plurality of extended fingers.

12. The method of claim 11 said method further comprising the steps of curing the foam and compressing the planes toward each other during said rolling step.

13. The method of claim 12 said method further comprising the step of bonding a face sheet to each of the planes on a side of the plane opposite that from which the plurality of fingers extend.

14. The method of claim 2 said method further including the step of perforating each finger to increase the pull-out and shear strength of a finger-to-core bond.

15. The method of claim 14 said method further including the step of infusing foam between the spaced apart planes and among the plurality of extended fingers.

16. The method of claim 15 said method further comprising the steps of curing the foam and compressing the planes toward each other during said rolling step.

17. The method of claim 16 said method further comprising the step of bonding a face sheet to each of the planes on a side of the plane opposite that from which the plurality of fingers extend.

18. The method of claim 2 said method further comprising the step of bonding a face sheet to each of the planes on a side of the plane from which the plurality of fingers extend.

19. The method of claim 2 said method further comprising the step of removing the planes.

* * * * *